United States Patent [19]

Shimoi

[11] Patent Number: 4,853,872
[45] Date of Patent: Aug. 1, 1989

[54] PROGRAM EXECUTION METHOD IN A SYSTEM HAVING PLURAL COMPUTERS

[75] Inventor: Kenji Shimoi, Kodaira, Japan

[73] Assignee: Hitachi, Ltd., Tokyo, Japan

[21] Appl. No.: 782,901

[22] Filed: Oct. 2, 1985

[30] Foreign Application Priority Data

Oct. 3, 1984 [JP] Japan ................ 59-206233

[51] Int. Cl.$^4$ .............................. G06F 15/00
[52] U.S. Cl. ........................... 364/300; 364/200; 364/280; 364/280.4; 364/232.21; 364/228
[58] Field of Search ... 364/200 MS File, 900 MS File, 364/300

[56] References Cited

U.S. PATENT DOCUMENTS 4,414,624  11/1983  Summer, Jr. et al. .............. 364/200
4,509,116   4/1985  Lackey et al. ..................... 364/200

OTHER PUBLICATIONS

Umetani, Yukio et al., "A Vectorization Algorithm for Control Statements", Journal of Information Processing, vol. 7, No. 3, 1984, pp. 170–174.

Takanuki, Ryuji et al., "Some Compiling Algorithms for an Array Processor", 3rd USA–Japan Computer Conference, 1978, Session 15-1-1 to Session 15-1-7.

Takanuki, Ryuji, et al., "Optimizing Fortran 77," Hitachi Review, vol. 30, No. 5, 1981, pp. 241–246.

Wagstaff et al., "Integrated High Speed Parallel-Sequential Computer", Proceedings of the IMACS (AICA)–GI, Symposium, Mar. 14–16, 1977, Technical Univeristy of Munich, pp. 343–346.

Primary Examiner—Gareth D. Shaw
Assistant Examiner—Jonathan C. Fairbanks
Attorney, Agent, or Firm—Antonelli, Terry & Wands

[57] ABSTRACT

In a system wherein a plurality of processors have instruction sets which are different at least in part from one another, it is possible for any processor to generate the object program. This is accomplished by generating object program sections inherent to the processors and the remaining sections which are common to the processors in the same object program.

5 Claims, 3 Drawing Sheets

PROGRAM EXECUTION METHOD IN A SYSTEM HAVING PLURAL COMPUTERS

BACKGROUND OF THE INVENTION

The present invention relates to a program execution method which is utilized in a multiprocessor system including a plurality of computers having partially different architectures.

In a prior art compiler, object programs are generated according to the hardware specifications of computers which execute the object programs. When one of the computers is improved and machine instructions are added to increase the processing capability thereof, the existing object programs cannot be executed in the improved computer in some cases or a sufficient performance cannot be achieved in the improved computer even if they are executable therein.

For example, in case of the HITACHI's large-sized computers M-200H with an Integrated Array Processor, the M-280H with an Integrated Array Processor, and the S-810 High Speed Array Processor, scalar processing is executable at any of the processors; however, the vector processing is the same among them because the hardware of the computers for vector processing have been improved from the M-200H to the M-280H and from the M-280H to the S-810 and hence the ranges of available vector processing machine languages are different among them. In this regard, refer to the "Optimizing FORTRAN77", HITACHI Review, vol 30, No. 5, 1981 by R. Takanuki and "Compiling algorithm and techniques for the S-810 vector processor:, ICPP, '84 by M. Yasumura.

Therefore, the same problem as described above arises with a system which includes computers having partially different architectures for the scalar processing.

Although the source program compatibility is retained among the computers, the compatibility at the object level is not realized; consequently, the user must manage the programs at the source program level. In order to implement the program management at the object program level, it is necessary to generate and manage the object programs separately for plural processors.

SUMMARY OF THE INVENTION

It is therefore an object of the present invention to provide a program execution method in a system including different computers which enables the user to execute the object program without considering the processors being used for such execution.

In accordance with one aspect of the present invention, there is provided a method for executing a program in a computer system including a plurality of computers, said computers being capable of executing a plurality of first common object codes, and at least a first one of said computers being capable of executing second object codes which are unexecutable in at least said one of the other computers, wherein the method comprises the steps of:

(a) compiling, by one of the computers, a source program into an object program comprised of:
 (i) a first object program section comprised of the first object codes and corresponding to a section of the source which is not executable by said second object codes in said first one computer;
 (ii) at least one group of second object program sections respectively to be executed by respective computers and corresponding to a section which is executable by said second object codes by said first computer, one of said second object program sections to be executed by said first computer being comprised of said object codes for said first one computer;
 (iii) at least one third object program section which is comprised of said first object codes, and detects, at an execution of said object program by the computer system, which one of said computers is executing said object program and selects one of said second object program sections corresponding to said detected computer;

(b) selecting one of said computers which is to execute the object program by means of execution of a scheduling program preloaded in a predetermined one of said computers; and (c) executing said object program by said selected computer.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

Figure 1:
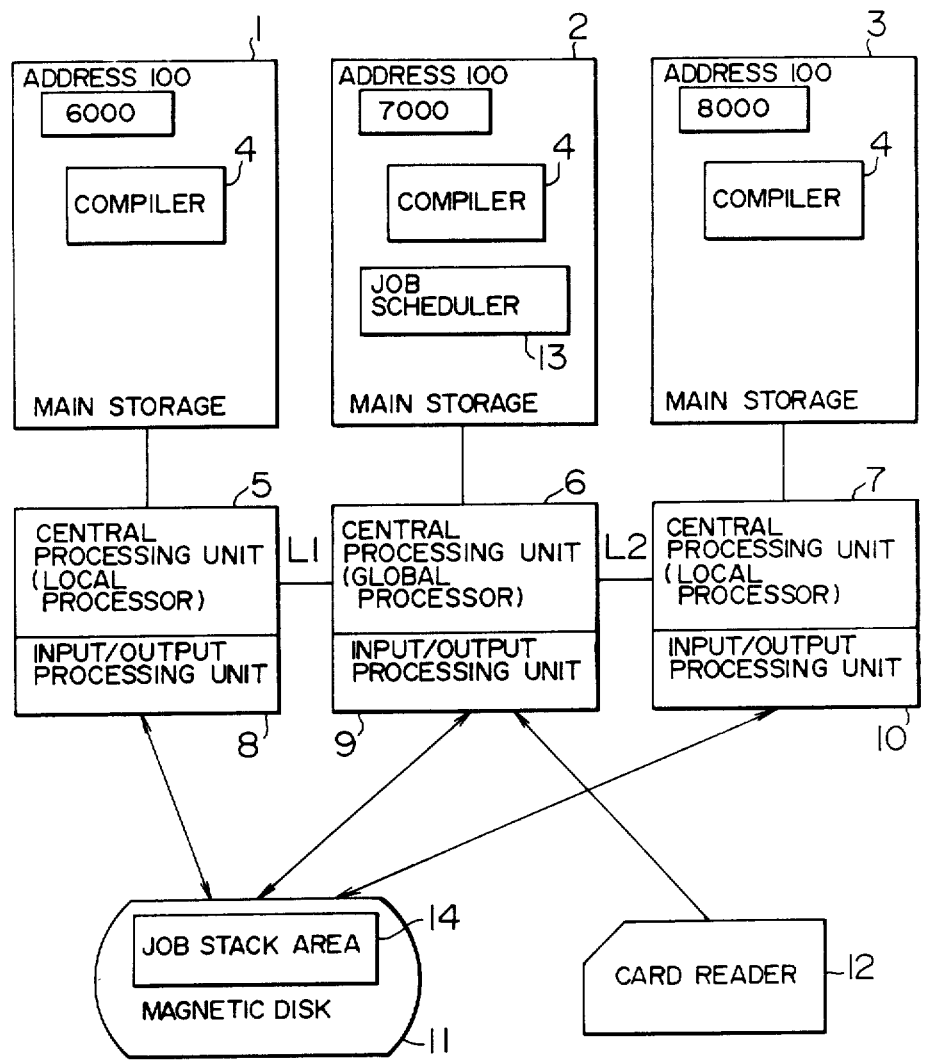
FIG. 1 is a schematic block diagram illustrating a configuration example of a multiprocessor system to which the present invention is applicable.

Referring now to FIG. 1, an embodiment of the present invention will be described. The system of FIG. 1 comprises a multiprocessor configuration in which three central processing units (CPU's) 5-7, for example, HITACHI's large-sized computers M-200H, M-280H, and S-810 are connected to each other. The CPU's 5-7 are compatible with respect to scalar processing operations, but they are not compatible with respect to vector processing operations (namely, there exist differences in the CPU architectures). The CPU 6, which is the main one among these CPU's, has a job scheduling function and is hence called a global processor. In contrast, the CPU's 5 and 7 are referred to as local processors. Job data comprised of object codes and prepared by the user is read from a card reader 12 and is temporarily stored in a job stack area 14 on a magnetic disk 11. The job stacked in the area 14 is assigned to an arbitrary one of the processors 5-7 by a job scheduler 13 in the global processor 6 according to a predetermined method. This condition is indicated to the local processors 5 and 7 via L1 and L2, respectively. The processor 5 or 7 fetches the job data from the area 14 and executes the job by use of the pertinent CPU. When the job is completed, the condition is reported to the processor 6 via the L1 or L2. A job can be also executed by the global processor 6.

Here, a compiler 4 is assumed to exist in the respective main storages 1-3.

Any types of job scheduling methods may be utilized, for example, a job may be scheduled depending on the load imposed on each processor or depending on the job size. In the multiprocessor system, therefore, the user need not consider the condition that a plurality of processors are operating. That is, the user need not specify a processor which executes a job.

On the other hand, if the processing capability greatly varies among the processors, the system operation may be modified to allow the user to specify using a job request a processor which executes the requested job. Based on the specified data, the job scheduler 13 schedules the job to be executed by the specified processor. The present invention is also applicable to such a case as described above.

Figure 2:
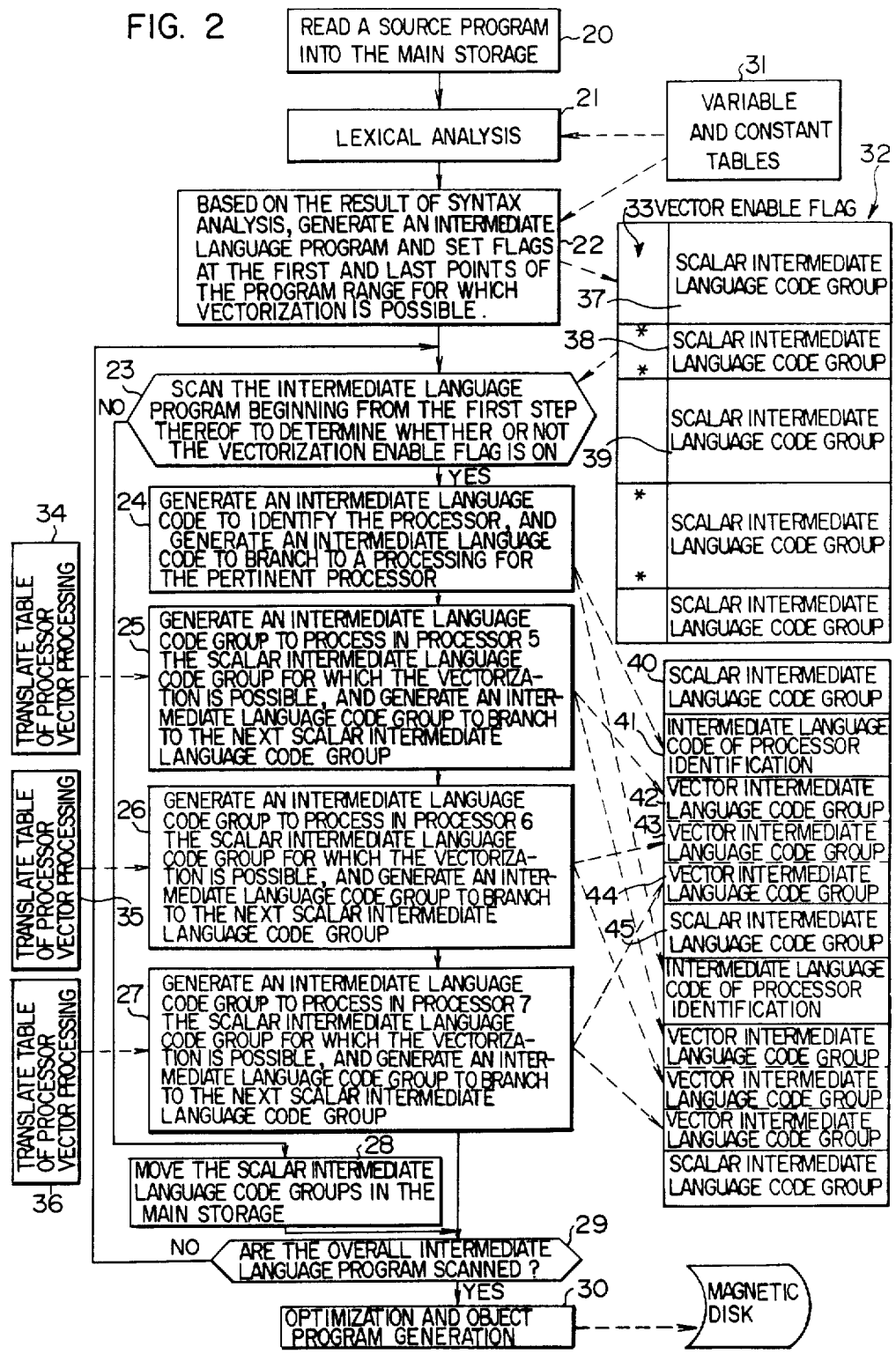
FIG. 2 is a logical structure block diagram schematically representing the logic of the compiler describing the main function of the present invention.

Next, the processing flow of the compiler 4 is shown in FIG. 2. Processing 20-22 and 30 of FIG. 2 has been well known and discussed in detail in the following literature, Ikuo Nakada: "Compiler", Sangyo Tosho Shuppan Co., Ltd., 1981 and Aho, A. V. and Ullman: "Principle of Compiler Design", Addison Wesley, 1977. Moreover, Processing 23, 25, 26, and 27 has been widely known and disclosed in the documents as follows: R. Takanuki: "Optimizing FORTRAN77", HITACHI Review, vol 30, No. 5, 1981: M. Yasumura: "Compiling algorithms and techniques for the S-810 vector processor", International Conf. on Parallel Processing (ICPP), August 1984; and Y. Umetani: "A Vectorization Algorithm for Control Statements", Journal of Information Processing, vol 7, No. 3, 1984. The steps of the flowchart will be described herebelow.

Step 20: A source program prepared by the user is read into the main storage.

Step 21: Each character string is checked on a character-by-character basis to extract basic elements, which are then analyzed to determine whether each element is a variable or a constant, then the results are stored in the main storage according to the table format 31.

Step 22: The structure of each sentence is checked and the sections of a program are analyzed to determine the correspondence between the sections and syntax rules. As a result, an intermediate language program 32 is generated in the main storage. In the syntax analysis, a program is checked to determine whether or not it is of the syntactically correct format and whether or not it can be vectorized. Flags are set at the first and last points of the vectorizable intermediate language program portion (33). A program portion written in FORTRAN can be determined to be vectorized depending on the condition that it is the inner-most DO loop or that a user subroutine call is not contained in the loop, for example. Refer to the following report for details: R. Takanuki: "Some Compiling Algorithms for an Array Processor", 3rd USA-JAPAN Comp. Conf., 1978.

Step 23: The vectorization enable flag area 33 corresponding to the scalar intermediate language program (a set of groups of scalar intermediate language codes) generated at the previous step is used to scan the program beginning from the first step thereof to find a program portion for which the pertinent flag is on. If the flag is on, program control proceeds to step 24; otherwise, control returns to the processing of step 29.

Step 24: Intermediate codes for identifying a processor and for branching to the entry of the processing of the pertinent processor are generated and are stored in the main storage 41. A processor is identified by reading the content of a specific address location of the main storage thereof. In an example of FIG. 1, the contents of address 100 of the main storages 1-3 are 6000, 7000, and 8000, respectively, which enables processor identification.

Step 25: A group of vector intermediate language codes for processing in the processor 5 a group of scalar intermediate language codes indicated to be vectorizable are generated by accessing the translate table 34 in the main storage for reference, and an intermediate language code for branching to the first item of the next group of scalar intermediate language codes is generated, then these codes are stored in the main storage 42.

Step 26: A group of vector intermediate language codes for processing in the processor 6 a group of scalar intermediate language codes indicated to be vectorizable are generated by accessing the translate table 35 in the main storage for reference, and an intermediate language code for branching to the first item of the next group of scalar intermediate language codes is generated, then these codes are stored in the main storage 43.

Step 27: A group of vector intermediate language codes for processing in the processor 7 a group of scalar intermediate language codes indicated to be vectorizable are generated by accessing the translate table 35 in the main storage for reference, and an intermediate language code for branching to the first item of the next group of scalar intermediate language codes is generated, then these codes are stored in the main storage 44.

Step 28: For scalar processing, the groups of scalar intermediate language codes 37 and 39 are moved to the main storage areas 40 and 45, respectively.

Step 29: This step checks whether or not the overall intermediate language problem has been scanned. If this is the case, program control proceeds to step 30; otherwise, it is passed to step 23 to check for the next vectorization enable flag.

Step 30: The optimization is achieved to arrange the object program to be more effective at execution thereof. For example, the unnecessary portions of the intermediate language codes are deleted or some sections are interchanged. After the optimization is completed, an object code program is generated from the intermediate language codes and is stored on a magnetic disk.

Figure 3:
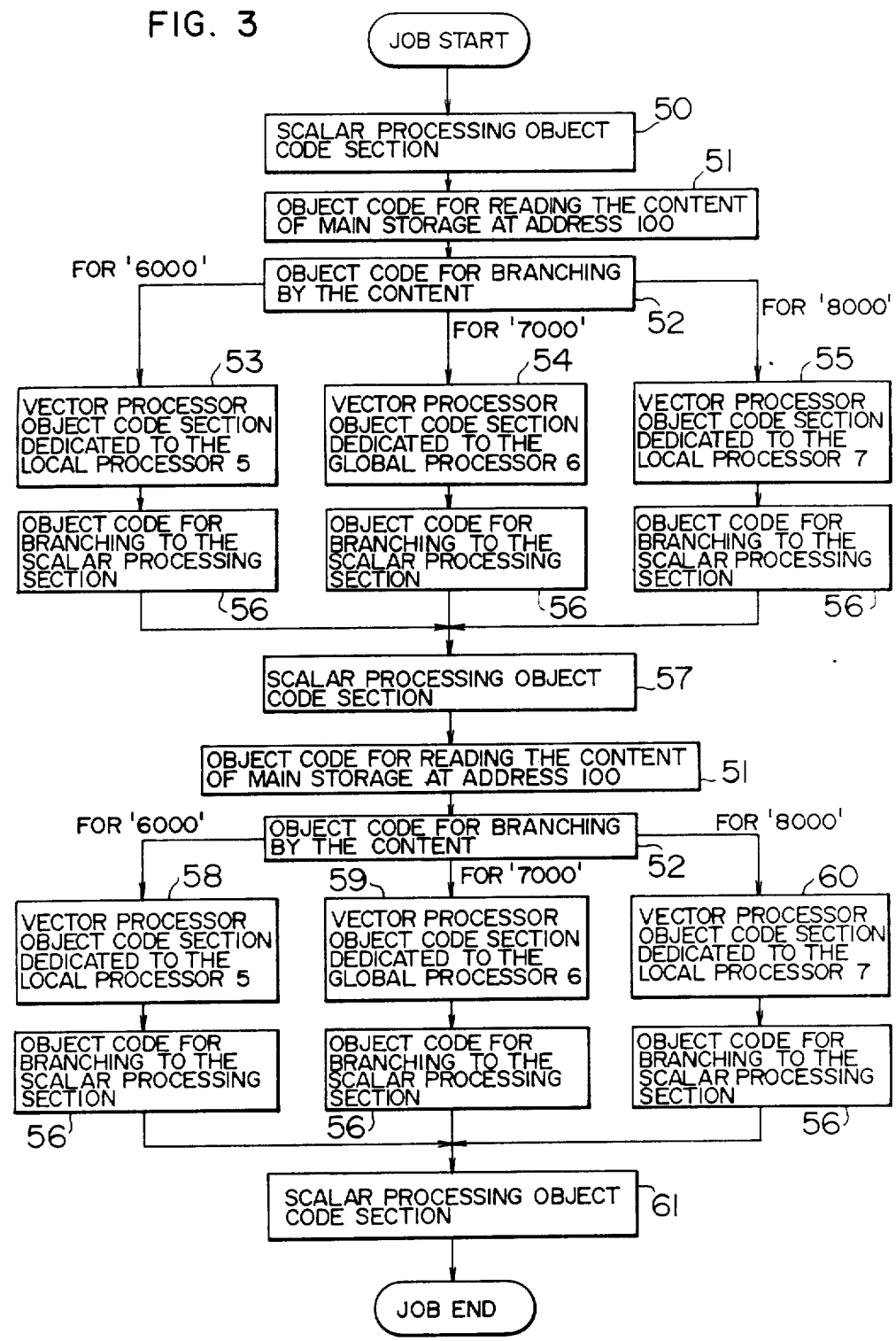
FIG. 3 is a flowchart representing an example of an object program which is generated by the compiler by means of the present invention.

FIG. 3 is a flowchart of the overall object program generated as described above.

The program starts its operation with a scalar processing object code section 50 followed by an object code for reading the content of the main storage at address 100 to determine the relevant processor. An object code 52 in turn passes program control to a destination address depending on the content read. For the processors 5-7, program control branches to the code sections 53, 54, and 55, respectively. After a processing unique to each processor is finished, an object code 56 is executed to branch to a scalar processing object code section which may be executable at any processor. The object code 56 is followed by an object code 56 for achieving a preprocessing 51-52 to execute a vector processing section. According to the kind of processor, program control proceeds to an object code section 58, 59, or 60, which is followed by an object code 56 for transferring control to a scalar processing object code section 61.

It should be noted that the scalar processing object code sections 50, 57, and 61 are not necessarily indispensable.

Furthermore, a job may contain an arbitrary number of vector processing sections.

When executing an object program generated as described above, the object program is assigned to one of the processors according to the job schedule method. For example, if it is assigned to the procesor 5, the program is executed through the steps 50, 51, 52, 53, 56, 57, 51, 52, 58, 56, and 61 in this order. Similarly, the program execution is effected in other processors as depicted in FIG. 3.

In accordance with the present invention, in a system comprising a group of computers having different architecture, the user is able to manage object programs without considering such a group of computers, which greatly improves the program management efficiency and allows programs to be executed in processors operating with a relatively lower load, thereby increasing the throughput of the overall system.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A method for executing a program in a computer system including a plurality of computers which operate under different loads at different times, said computers being capable of executing a plurality of first common object codes, and at least a first one of said computers being capable of executing second object codes which are unexecutable in at least one of the other computers, wherein the method comprises the steps of:
 (a) compiling, by means of one of the computers, a source program into an object program comprised of:
  (i) a first object program section comprised of said first common object codes and corresponding to a section of the source program which is not executable by said second object codes in said first one of said computers;
  (ii) at least one group of second object program sections respectively to be executed by respective computers and corresponding to a same section of said source program which is executable by said second object codes by said first one of said computers, one of said second object program sections to be executed by said first computer including said second object codes for said first one of said computers;
  (iii) at least one third object program section which is comprised of said first object codes, and detects, at an execution of said object program by the computer system, which one of said computers is selected so as to execute said object program and selects one of said second object program sections corresponding to said detected computer;
 (b) selecting, one of said computers which is to execute the object program, by means of execution of a scheduling program preloaded in a predetermined one of said computers; and
 (c) executing said object program by said selected computer, whereby said first and third object program sections and one of said second object program sections corresponding to said selected computer are executed;
 wherein said selection of said selected computer for executing said object program is effected such that one of said computers which has a load lower than any other of said computers in the system is selected.

2. A method for compiling a source program into an object program to be executed in a computer system including a plurality of computers, said computers being capable of executing a plurality of first common object codes and at least a first one of said computers being capable of executing a plurality of second object codes which are unexecutable in at least a second one of the computers, wherein said method comprises the step of:
 (a) detecting at least one first section of a source program, said first section being unexecutable by said second object codes by said first computer;
 (b) converting said first section into a first object program section;
 (c) converting at least one of the second sections of the source program which is executable by said second object codes by said first computer into at least one group of second object program sections to be respectively executed in said plurality of computers, said one of said second object program sections to be executed by said first computer being comprises of said second object codes;
 (d) generating at least one third object program section which is comprised of said first object codes, and detects at an execution of said object program which one of said plurality of computers is executing said object program and selects one of said group to second object program sections corresponding to said selected computer executing said object program; and
 (e) inputting data at a program execution to specify one of said computers for program execution, said selection being based on said data inputted by one of said computers for the program execution.

3. A method for executing a program in a computer system including a plurality of computers, said computers being capable of executing a plurality of first common object codes, at least a first one of said computers being capable of executing a plurality of second object codes which are unexecutable in at least a second one of the computers, wherein said method comprises the steps of:
 (a) inputting in said computer system an object program including:
  (i) at least one first object program section resulting from a conversion effected on a first section of a source program, said first section being unexecutable by said second object codes by said first computer;
  (ii) at least one group of second object program sections obtained by converting the sections of the source program which is executable by said second object codes by said first computer to be executed respectively by said plurality of computers; and
  (iii) at least one third object program section which is comprised of said first object codes, and detects at an execution of said object program which one of said plurality of computers is executing said object program and selects one of said plurality of second object program sections corresponding to said computer executing said object program;

(b) selecting one of said computers to execute said object program, based on a predetermined criterion and a predetermined one of said computers; and (c) executing said object program by said selected computer, whereby said first and third object program sections corresponding to said selected computer are executed;

wherein said third object program section includes an object program section which reads data from a specific address location of a main storage of said selected computer during executing of said third object program section and, based on said data identifies said computer.

4. A method for executing a program in a computer system including a plurality of computers, said computers being capable of executing a plurality of first common object codes, and at least a first one of said computers being capable of executing second object codes which are unexecutable in at least one of the other computers, wherein the method comprises the steps of:

(a) compiling, by means of one of the computers, a source program into an object program comprised of:

(i) a first object program section comprised of said first common object codes and corresponding to a section of the source program which is not executable by said second object codes in said first one of said computers;

(ii) at least one group of second object program sections respectively to be executed by respective computers and corresponding to a same section of said source program which is executable by said second object codes by said first one of said computers, one of said second object program sections to be executed by said first computer including said second object codes for said first one of said computers;

(iii) at least one third object program section which is comprised of said first object codes, and detects, at an execution of said object program by the computer system, which one of said computers is selected so as to execute said object program and selects one of said second object program sections corresponding to said detected computer;

(b) selecting, one of said computers which is to execute the object program, by means of execution of a scheduling program preloaded in a predetermined one of said computers; and (c) executing said object program by said selected computer, whereby said first and third object program sections and one of said second object program sections corresponding to said selected computer are executed;

wherein said third object program section includes an object program section which reads data from a specific address location of a main storage of said selected computer during executing of said third object program section and, based on said data identifies said computer.

5. A method for executing a program in a computer system including a plurality of computers, said computers being capable of executing a plurality of first common object codes, and at least a first one of said computers being capable of executing second object codes which are unexecutable in at least one of the other computers, wherein the method comprises the steps of:

(a) compiling, by means of one of the computers, a source program into an object program comprised of:

(i) a first object program section comprised of said first common object codes and corresponding to a section of the source program which is not executable by said second object codes in said first one of said computers;

(ii) at least one group of second object program sections respectively to be executed by respective computers and corresponding to a same section of said source program which is executable by said second object codes by said first one of said computers, one of said second object program sections to be executed by said first computer including said second object codes for said first one of said computers;

(iii) at least one third object program section which is comprised of said first object codes, and detects, at an execution of said object program by the computer system, which one of said computers is selected so as to execute said object program and selects one of said second object program sections corresponding to said detected computer;

(b) selecting, one of said computers which is to execute the object program, by means of execution of a scheduling program preloaded in a predetermined one of said computers;

(c) executing said object program by said selected computer, whereby said first and third object program sections and one of said second object program sections corresponding to said selected computer are executed; and (d) inputting data at a program execution to specify one of said computers for program execution, said selection being based on said data inputted by one of said computers for the program execution.

* * * * *